July 13, 1937.  F. W. HOORN  2,086,554
FILM FEEDING SYSTEM FOR SOUND MOTION PICTURE APPARATUS
Filed June 12, 1934    5 Sheets-Sheet 2

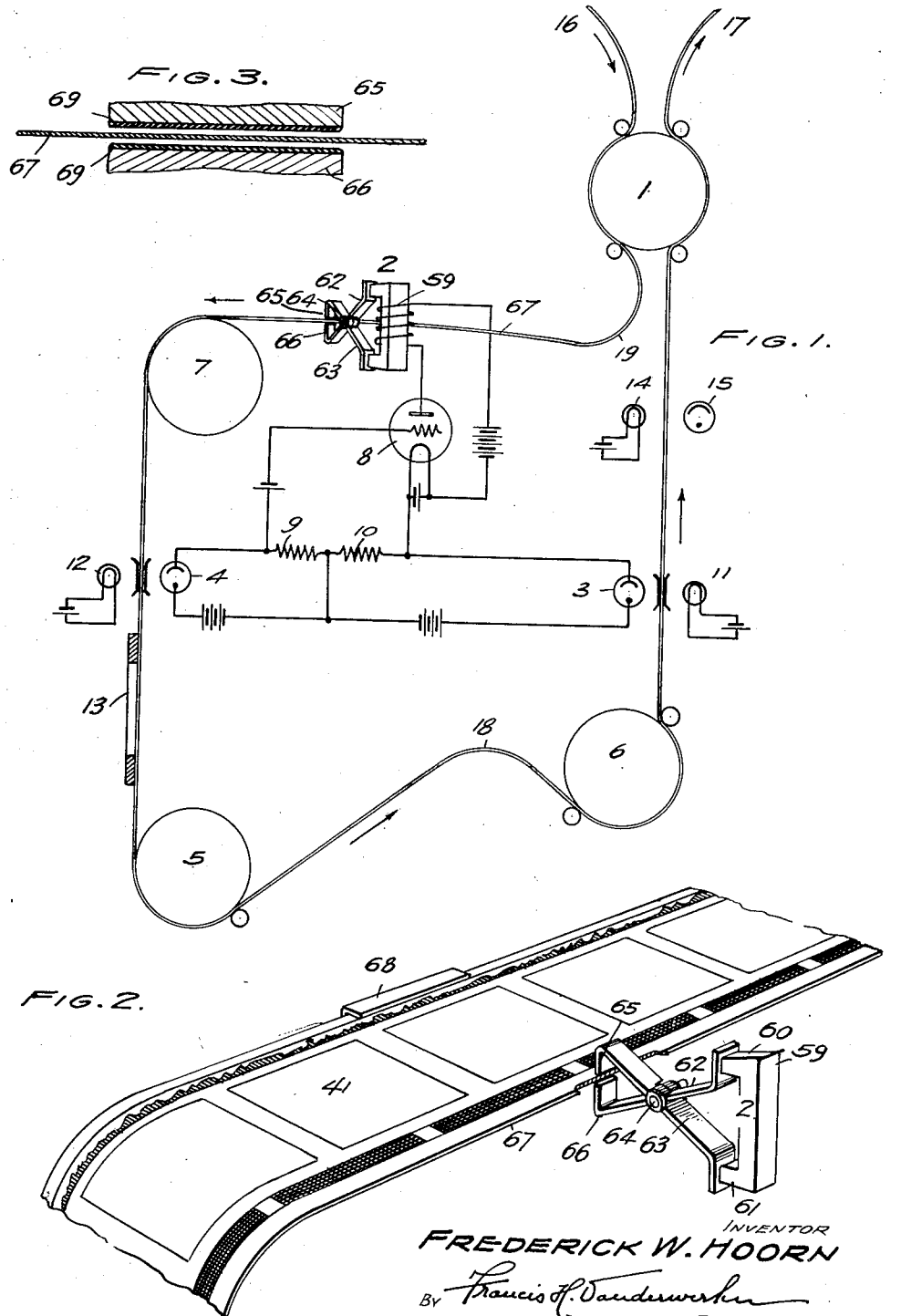

INVENTOR
FREDERICK W. HOORN
ATTORNEYS

July 13, 1937.  F. W. HOORN  2,086,554
FILM FEEDING SYSTEM FOR SOUND MOTION PICTURE APPARATUS
Filed June 12, 1934  5 Sheets-Sheet 3
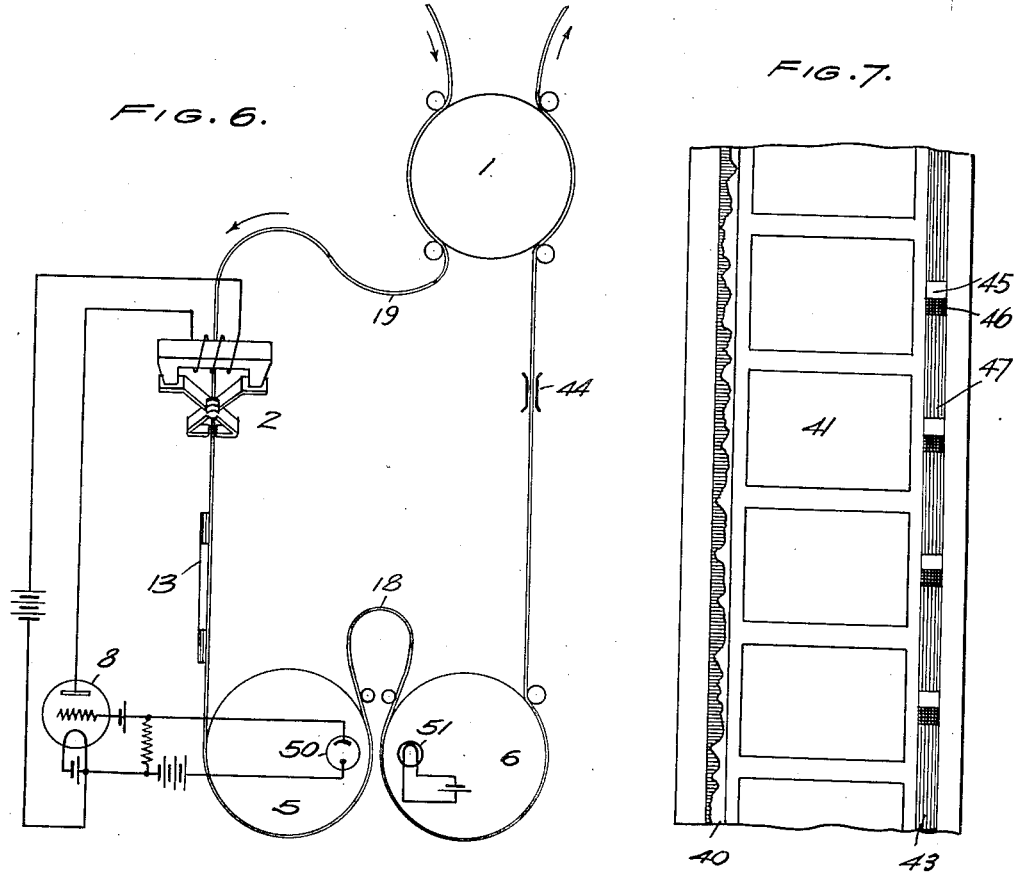
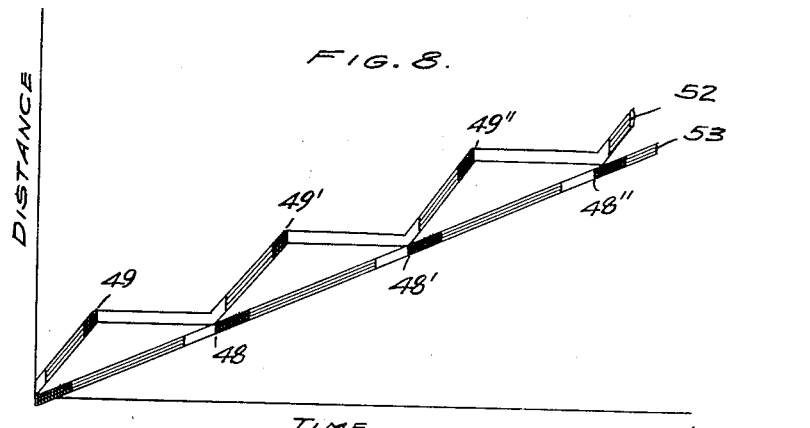
INVENTOR
FREDERICK W. HOORN
BY
ATTORNEYS

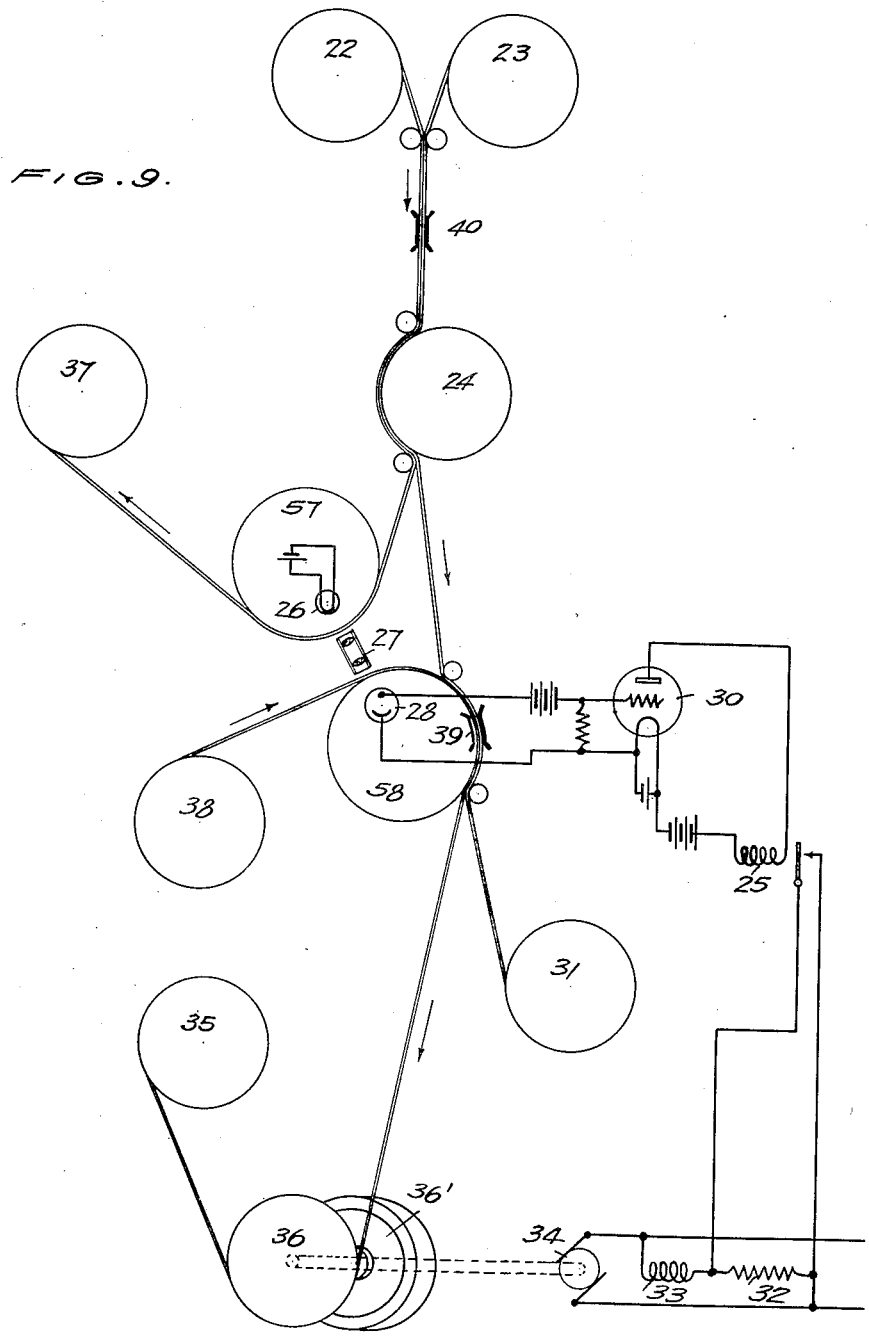

Patented July 13, 1937

2,086,554

UNITED STATES PATENT OFFICE 2,086,554

FILM FEEDING SYSTEM FOR SOUND MOTION PICTURE APPARATUS

Frederick W. Hoorn, Washington, D. C.

Application June 12, 1934, Serial No. 730,278

21 Claims. (Cl. 271—2.3)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to methods and means of effecting and controlling the motion of imperforate films through motion picture apparatus.

Methods of feeding film heretofore used, wherein sprocket teeth are made to engage perforations in the film, involve many inherent disadvantages. The principal ones are, the liability of the film to tearing and breaking, the difficulty of projecting shrunken film, the introduction in the sound component of sprocket hole modulation and distortion due to slippage in printing the sound track. Further, quiet, positive, operation and simplicity of threading, are difficult to obtain except by expensive engineering.

An object of the present invention is to provide a method and means whereby an imperforate film may be fed through a motion picture projector in such a manner that its movement past a sound gate, or aperture, is continuous and uniform; and its motion past a picture gate is intermittent or periodical, with provisions whereby the intermittent feed is accomplished in the usual step by step manner and at the proper rate in relation to the continuous feed; and whereby each halt of the intermittently fed film is accomplished in the correct position for the projection of a picture frame.

A further object of the invention is to provide means whereby an imperforate sound negative, a separate, imperforate picture negative, and imperforate raw stock, or unexposed positive, may be fed through a machine such as a motion picture printer, in such a manner as to print the sound track by continuous printing, and to print the picture frames in correct fixed relationship thereto, that is with a predetermined distance between each picture frame and the portion of the sound track to which it corresponds.

The structural organization and mode of operation will now be described in detail in connection with the accompanying drawings in which:

Fig. 1 shows schematically the elements of the film feeding arrangement in a sound film projector, including the electrical circuits employed in effecting control of the feed;

Fig. 2 is a perspective view showing the feed arresting mechanism in operative relation to the film;

Fig. 3 is a sectional detail of the gripping elements of the feed arresting mechanism;

Fig. 6 represents another embodiment of the invention in a sound film projector utilizing only one light sensitive element;

Fig. 7 represents a form of film suitable for use in the projector of Fig. 6;

Fig. 8 represents graphically the motion of the continuous and the intermittently moving films past the single scanning slit of the projector of Fig. 6;

Fig. 9 represents an adaptation of the principle of this invention to a continuous type of printer and Fig. 10 shows a means for making prints from separate, imperforate negatives, in which the picture is printed by the step method, while the sound is printed continuously.

Figure 4:
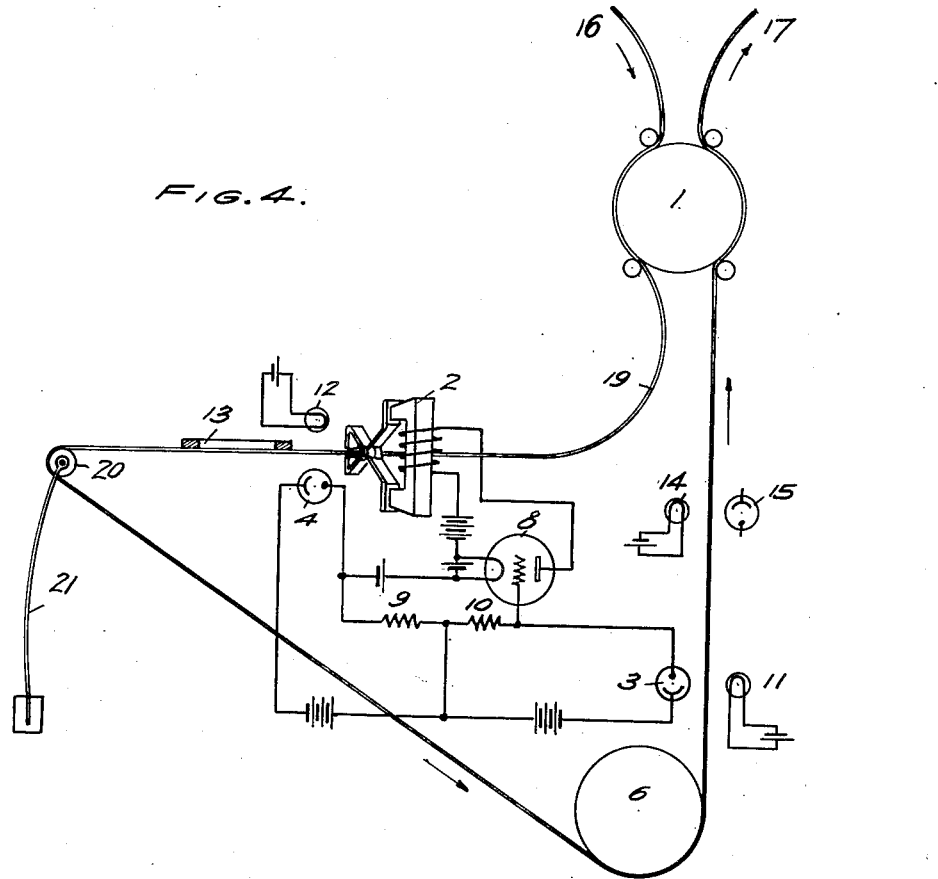
Fig. 4 represents another embodiment of the invention as applied to a sound motion picture projector, in which a different mechanical means is employed for effecting the intermittent motion.

For simplicity, the projection lamp, lens and shutter are omitted in the several views, and the sound reproducing system is generally represented only by a light source and a light sensitive cell.

Referring now to Fig. 1, the main drive drum 1 moves the film continuously from the payout reel into the projector mechanism and out from the mechanism to the take-up reel. The feed arresting mechanism 2 is the device which periodically clamps the film and arrests its forward motion. As will be seen by reference to Fig. 2, the feed arresting mechanism 2 is here shown as an electro-magnetic device comprising a solenoidally operated core 59, generally U-shaped, having poles 60 and 61, which when energized actuate a tong like structure including a pair of arms 62 and 63 pivoted at 64, whereby the oppositely disposed gripping elements 65 and 66 are caused to grasp the edge of the film as at 67 to arrest its feeding movement. In the present embodiment only one feed arresting mechanism is shown, but it is obvious that these devices may be used in oppositely arranged pairs. The opposite edge of the film passes through a guide as at 68. As shown in Fig. 3, the gripping elements 65 and 66, are faced with some suitable yielding material designated by the numeral 69 to facilitate the gripping function without marring the film. The action of this feed arresting mechanism is subject to control by the light sensitive means such as elements 3 and 4. Light sensitive element 3 provides the releasing impulse for the feed arresting mechanism and light sensitive element 4 provides the arresting impulse. Their control of the feed arresting mechanism is effected through the medium of vacuum tube or equivalent element as at 8. This element 8, here shown as a vacuum tube, may be a grid glow tube, an electromagnetic relay or any sort of relay device which, operating on a small voltage, produces a sufficient output power to operate feed arresting mechanism 2. The relay device may be dispensed with by using for the light sensitive elements 3 and 4, photo-glow tubes of sufficient power to actuate the feed arresting mechanism directly. Drum 5 provides the force which moves the film intermittently forward, when the film is not held in check by the feed arresting mechanism. This drum rotates continuously at a speed considerably in excess of the average film speed. When the film is held stationary by the arresting mechanism it slips over this drum. When released, it is driven forward by it. Drum 6 is an idler possessing, or connected to a sufficient mass, to assure its uniform rotation and provide a constant film feed from drum 6 to drive drum 1. Light sensitive element 15 and its associated light source 14 will serve to represent the control features of the usual sound reproducing system, the characteristics of which are well known in the art. Gate 13 is the framing aperture, through which the picture is projected while stationary. The intermittently moving section of film extends from feed arresting mechanism 2 to drum 5. The continuously moving section extends from drum 6 to drive drum 1. It will be understood that drums which function as drive drums are actuated by suitable power sources not shown.

Figure 5:
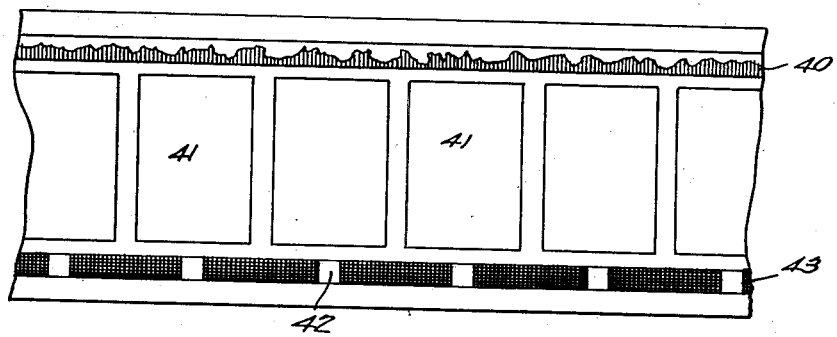
Fig. 5 represents a possible arrangement of the various elements of the film viz: picture, sound track and movement track.

Referring now to Fig. 5, it will be seen that the film which this projector is designed to utilize, has picture frames and sound track similar to those now in use. Its novelty consists in the absence of perforations or sprocket holes, and the substitution therefor, of a movement track, consisting of a series of markings or impressions, which are repeated for each frame of the picture. The sound track is shown at 40, the picture at 41 and the movement track at 43. While various arrangements and forms of the transparent and darkened areas in the movement track are possible, an effective and sufficient arrangement consists in a series of alternate transparent and opaque sections as shown. At 42 the transparent section is shown opposite the middle of the frame. It may be placed anywhere relative to the frame, provided all transparent sections are in exactly the same positions with respect to their frames.

Referring again to Fig. 1, the detailed operation of the projector utilizing this film will be outlined as follows: Driven by drum 1 the film moves continuously past light sensitive element 3, which in conjunction with its light source 11 and a narrow slit between the two, scans the movement track of the continuously moving section of film. As a transparent section of the movement track arrives opposite this slit, light sensitive cell 3 is energized, causing a current flow through resistance 10. A negative potential is thus applied to the grid of vacuum tube 8, preventing the flow of current through the feed arresting mechanism 2. This mechanism is, therefore, rendered inoperative and the film is permitted to start forward through the intermittent section. Under the forward impulse of the slip drum 5, this forward movement starts.

Light sensitive cell 4 scans the movement track through a narrow slit and is actuated by source 12. If this cell is opposite a transparent section of the movement track at the beginning of the intermittent motion, it clears its transparent section before cell 3 has become darkened, owing to the fact that the intermittent section of film must move considerably faster than the continuously moving section. While the intermittent section is still moving and after an opaque section has arrived opposite cell 4, an opaque section arrives opposite cell 3, bringing the potential differences across resistances 9 and 10 substantially to zero. The biasing voltage is now the only voltage being applied to the grid. In this condition the feed arresting mechanism is still inoperative, as the plate current through the tube can be made as small as necessary by adjusting the bias. A transparent section of the movement track now arrives opposite light sensitive cell 4, causing the grid of element 8 to be made positive with respect to the filament. Feed mechanism 2 is, therefore, actuated and the forward movement of the film is arrested in the section between 2 and 5, until a transparent section of the movement track again arrives opposite light sensitive element 3, which becomes energized and acts in opposition to light sensitive element 4, effecting again the release of mechanism 2 and another forward movement of the intermittent section results. A snubbing drum 7 may or may not be provided to assist in stopping the motion of the film without applying a force sufficient to injure the emulsion. This snubbing drum is stationary and may be covered with a suitable yielding material which will not damage the base of the film on which it operates. Loops 18 and 19 take up the slack between the intermittent section and the continuously moving section of film.

Fig. 4 represents another embodiment of the principles of this invention, wherein the slip-drive drum as a means of producing the forward motion of the intermittent, is replaced by a spring 21 which, through roller 20 keeps the film under constant tension. The guide roller 20 and spring 21, in their cooperative relation, act to provide an auxiliary feeding means. Only one loop 19 is maintained. The operation and functions of other elements are the same as those described for Fig. 1. Light sensitive element 4 becomes energized and actuates feed arresting mechanism 2, through tube 8. The film is, therefore, stopped at 2 but continues to be fed along by drive drum 1 and idler 6. Spring 21, therefore, gives way toward aperture 13. When light sensitive element 3 becomes energized, feed arresting mechanism 2 releases, and spring 21 again pulls the film forward through picture aperture 13, until stopped by another impulse from element 4.

Referring now to Fig. 6, it will be seen that the principal difference from the apparatus of Fig. 1, is in the combination of the functions of the separate light sensitive elements in one, or a battery of light sensitive elements operating as a single unit may be employed. Feed arresting mechanism 2 and drums 1, 5 and 6 have functions and operate in the manner previously described. Light sensitive element or unit 50 and its source 51 are arranged to scan the movement tracks of both the continuous and intermittent sections of film. The beam from 51 passes through a slit and through the two oppositely moving films and acts on light sensitive element 50. Whenever this unit 50 receives more than a predetermined amount of light, its output amplified by vacuum tube 8 operates feed arresting mechanism 2 and stops the film feed in the intermittent section. The film to be used with this apparatus is shown in Fig. 7. It has a sound track 40, picture areas or frames 41, and movement track 43. Unlike the previously described film, the movement track contains areas or sections of three different degrees of opacity. 45 is a clear or transparent area, 46 is a black area, transmitting substantially zero light, and 47 is a gray area transmitting a portion of the light falling upon it. This arrangement of the movement track is desirable in order to make the arresting action of the intermittent part of the film at the proper place, sufficiently independent of the speed of the intermittent motion. If a track of only two densities were used, and the film in the intermittent section were advanced a little too rapidly, the clear area in the continuous section might arrive at the scanning slit of element 51, after the arrival of the clear area in the intermittent section. This would cause the film to stop in the wrong place, as its stopping would be determined by the position of the continuously moving section instead of being determined by the position of the intermittent section as is required. In using the film shown in Fig. 7, the densities in the movement track and the constants of the circuits and the arresting apparatus, are such that when a clear area in each of the two films scanned is opposite the scanning slit, or when a clear area in one section and a gray area in the other section, are scanned by the slit, the light transmitted through the two films is sufficient, so that element 50 acting through the amplifying tube 8 effects the operation of feed arresting device 2 and stops the film. However, if both the areas scanned are gray or if either is black, the light transmitted to light sensitive element 50 is insufficient to effect the operation of the feed arresting mechanism 2 and the film is permitted to travel forward. It can readily be seen that this action of the various combinations in the movement track can be effected, for if the relative light transmissions of the clear, gray and black areas are, say, 1, .5, and 0, the total transmission of light for the various combinations will be relatively as follows:

Clear areas in both sections_____ 1
Clear and gray_____ .5
Gray and gray_____ .25 Black with either clear, gray, or black_____ 0

In this assumed case the bias of tube 8 would be adjusted so that it would substantially neutralize the output voltage of light sensitive element 50 whenever the relative transmission was .25 or less. The movement of the two films past the scanning slit between light sensitive element 50 and source 51 is illustrated in Fig. 8. Graph 52 represents the motion of the intermittent film past the scanning slit, and 53 represents the continuous motion past this same slit. In the intermittent motion arrested points are indicated at 49, 49' and 49''. Releases are successively effected at points 48, 48' and 48'' when the continuously moving section reaches the scanning slit. As the densities of the various areas on the movement track are shown on these two graphs, the combination of densities opposite the scanning slit at any particular time can be determined by projecting an ordinate through the two graphs at the desired point on the time axis.

Referring now to Fig. 9 a method of making a composite print on imperforate film, from separate sound and picture negatives, also imperforate, is shown, wherein a movement track scanned by a single light sensitive element, is used to control the movement of the raw stock or unexposed positive and the other negative. The sound negative is fed from pay out reel 22 and the raw stock from reel 23. Picture negative is fed from reel 38 over intermediate drum 58, which also carries a section of the positive in printing relation to said negative, which acquires feeding movement through driving drum 36 and is then taken up on reel 35. The sound track is printed in aperture 40 both the sound track negative and the positive films moving continuously through this aperture under the driving action of drum 24. As it passes over drum 57 the sound negative passes a scanning slit opposite exciter lamp 26. Another scanning slit is between light sensitive element 28 and the picture negative, and in alignment with the exciter lamp slit. Numeral 27 designates an optical system permitting the light sensitive element to scan the movement track of both films through these two slits. It will be understood that a movement track similar to that of Fig. 5 or Fig. 7 is printed or otherwise impressed on both sound and picture negatives. Whenever light transmitting areas in both sound and picture negatives come opposite their respective scanning slits simultaneously, light source 26 energizes light sensitive element 28, which acting through amplifying device 30, actuates relay 25. This short circuits resistance 32 in series with the field 33 of the shunt motor 34. As this motor drives drum 36, which moves the picture negative, the speed of the picture negative is kept at a value such that a transparent area in the movement track 40 of the picture negative is arriving at its slit opposite light sensitive element 28 just as the corresponding transparent area in the movement track of the sound negative is leaving its slit opposite light source 26. As soon as they overlap, a correcting impulse is applied, which slows down the motor until the movement track of the sound negative opposite the slit is dark before the transparent area in the movement track of the sound negative has arrived at the slit. No light then reaches light sensitive element 28 and the relay again opens, speeding up the motor and starting another cycle. It might appear that this process would cause variations in the speed of the picture negative, since the device cannot anticipate the need for corrections. However, minute variations from the correct relative position of the two films, can be made to cause operation of relay 25 and with a proper flywheel as at 36' on drum 36, the speed variations can be kept below a harmful value. The printing of the picture and the movement track is done at aperture 39.

It is apparent that, if the length of the picture negative per frame differs from that of the raw stock, owing to shrinkage or other causes, some slippage at the picture printing aperture is bound to occur. However, this need not be any more serious than in present types of continuous printers. The slippage at the sound printing aperture will be substantially zero, as there will be practically no force tending to cause such slippage.

Figure 10:
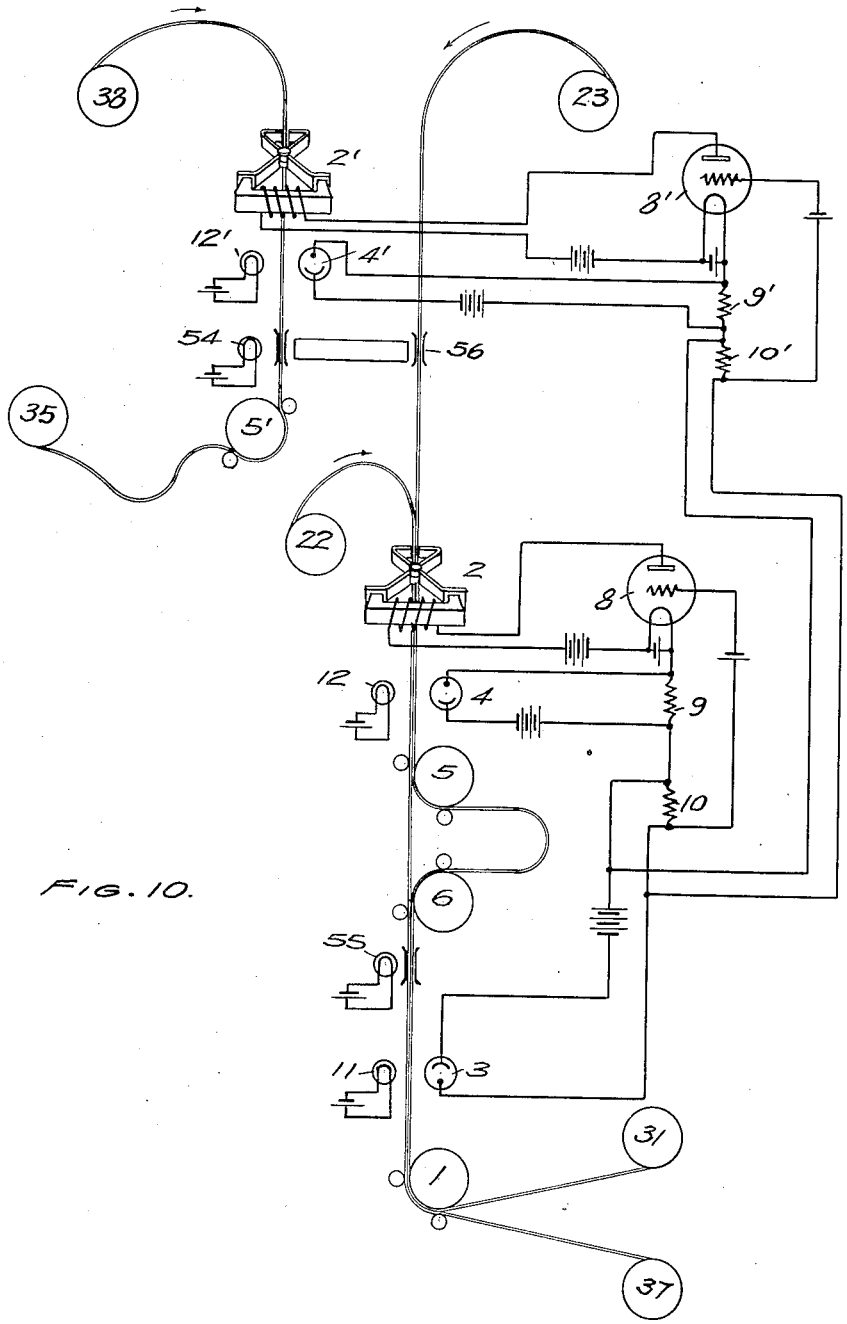

Another type of printer for printing imperforate positives from separate sound and picture negatives is illustrated in Fig. 10. This arrangement is a step type of printer for the picture and continuous for the sound. The control of the movement is effected in a manner similar to that employed in the projectors of Fig. 1 and Fig. 4. Picture negative is fed from reel 38 and taken up on reel 35. Positive raw stock is fed from reel 23 and after being printed is taken up on reel 31. Sound negative is fed from reel 22 and is taken up on reel 37. Light source 54 prints the picture and light source 55 prints the sound track. Light source 11 and light sensitive element 3 scanning the continuously moving movement track of the sound negative, furnish the impulses which release the feed arresting mechanisms 2 and 2', permitting the intermittent sections of the films to start forward. The picture negative, actuated by friction drive drum 5' moves forward until stopped by a transparent area in its movement track arriving opposite the slit of light sensitive element 4' which actuates feed arresting mechanism 2'. The sound negative and raw stock, driven by friction drive drum 5 move until stopped by the arrival of a transparent area in the movement track of the sound negative at the scanning slit of light sensitive element 4. This actuates feed arresting mechanism 2 which stops the movement of sound negative and raw stock. The raw stock remains stationary between drum 5 and picture aperture 56. The picture is then printed at aperture 56. A transparent area again arrives opposite element 3 and the cycle is repeated.

Changes and modifications are contemplated within the scope of the invention and as defined by the appended claims.

I claim:

1. In a sound motion picture system, employing a film having a movement track, said track being provided with areas spaced to transmit light periodically; means for continuously feeding the film; mechanism for arresting the film feeding movement; a light source; and light sensitive means operative with said source, said means being energized through said areas for controlling the action of said mechanism.

2. In a sound motion picture system, employing a film having a movement track provided with areas spaced to transmit varying light values in a predetermined order; means for continuously feeding the film; feed arresting mechanism; a light source, and light sensitive means operative therewith, said means being energized through said areas to control said mechanism in accordance with said order.

3. In a sound motion picture system, employing a film having a movement track, said track being provided with areas spaced to transmit light periodically; means for continuously feeding the film; a feed arresting mechanism; a source of light, and light sensitive means operative therewith, said means being energized through said areas to effect step by step control of said mechanism.

4. In a sound motion picture system, employing a film having a movement track provided with areas spaced to transmit light in predetermined steps; means for continuously feeding the film; a feed arresting mechanism operative with a section of the film; a source of light; and light sensitive means operative with said source, said means being energized periodically through said areas to effect step by step control of said mechanism.

5. In a sound motion picture system, employing a film formed with a movement track, said track being provided with areas spaced to control the transmission of light in a predetermined order; means for continuously feeding the film; mechanism for arresting the film feeding movement; a light source, and light sensitive means operative therewith, said means being energized in accordance with the order of said areas to control the action of said mechanism.

6. In a sound motion picture system, employing an imperforate film formed with a movement track, said track being provided with areas spaced to transmit varying light values in a predetermined order relative to the picture frames; means for continuously feeding the film; feed arresting mechanism; a light source; and light sensitive means operative with said source, said means being energized in accordance with the order of said areas to control the action of said mechanism.

7. In combination with the film feeding system of sound motion picture apparatus, employing a film formed with a movement track provided with areas spaced to transmit light periodically; means for exerting a continuous feeding force upon the film; a feed arresting mechanism; light sensitive means and a source of light operative therewith, said means being periodically energized through said areas to effect step by step control of said mechanism.

8. In combination with the film feeding system of sound motion picture apparatus, in which a film is employed having a movement track provided with areas spaced to transmit light in a predetermined order; means for exerting a continuous feeding force upon the film, a feed arresting mechanism operative with a section of the film; a source of light; and light sensitive means operatively related to said source, said means being energized through said areas to actuate said mechanism periodically in accordance with said order.

9. In combination with the film feeding system of sound motion picture apparatus, employing a film formed with a movement track, said track being provided with areas spaced to transmit and interrupt light in a predetermined order; means for exerting a continuous feeding force upon the film, electrical means to control the feeding action, including a feed arresting mechanism; a source of light; and light sensitive means operative therewith, said means being energized under the control of said areas to actuate said mechanism periodically in accordance with said order.

10. In the film feeding system of sound motion picture apparatus, which employs an imperforate film having a movement track, said track being provided with light transmitting areas corresponding to each picture frame; means for continuously exerting a feeding force upon the film, means for feeding a section of the film intermittently, including a feed arresting mechanism; a source of light; and light sensitive means periodically energized through said areas to control the action of said mechanism.

11. In a sound motion picture system, employing an imperforate film having a movement track, said track being provided with areas spaced to control the transmission of light in accordance with the order of the picture frames; means for feeding one section of the film continuously; means for feeding another section of the film intermittently, including a feed arresting mechanism; a light source; and light sensitive means operative therewith, said means being energized through the areas of each of said sections alternately to lock and unlock said mechanism.

12. In the film feeding system of a sound motion picture apparatus, employing a film having a movement track provided with light transmitting areas, each area registering with a picture frame; means for feeding the film in sections, and including a feed arresting mechanism operative with one of said sections; a light source; and means operative therewith, comprising light sensitive elements acting alternately with said sections and energized through said areas for effecting step by step control of said mechanism.

13. A film feed for sound motion picture systems, which employs an imperforate film provided with a movement track; light transmitting spaces in said track in a predetermined order of arrangement; means for feeding the film in sections, including a feed arresting mechanism operative with one of said sections; a light source, and means operative with said source comprising light sensitive elements functioning respectively with said sections, and energized through the spaces of the sections alternately to effect step by step control of said mechanism in accordance with said order of arrangement.

14. In a film feeding system for sound motion picture apparatus, employing an imperforate film formed with a movement track, said track being provided with areas spaced to transmit and interrupt light in a predetermined order; means for feeding the film continuously and in sections; electrical means to control the feeding action, including a feed arresting mechanism; a source of light for each section; and means operative with each source, comprising light sensitive elements acting respectively with said sections and energized through the areas of the sections in periodic alternation to control the said mechanism.

15. In combination with the film feeding system of sound motion picture apparatus, employing an imperforate film formed with a movement track, said track being provided with areas spaced to control the transmission of light corresponding to the order of the picture frames; means for continuously exerting a feeding force upon the film, a solenoidally operated device for arresting the film feeding movement; an electrical circuit including the windings of the solenoid; light sensitive means operative with said circuit; and a light source for energizing the said means under the control of said areas whereby said device is periodically actuated as determined by said order.

16. In a system of the character described adapted to utilize an imperforate film formed with a movement track, said track being provided with areas spaced to transmit and interrupt light periodically corresponding to the picture frames; means for feeding one section of the film continuously; means for feeding another section of the film intermittently, including a feed arresting mechanism; a light source; and electrical means comprising a light sensitive unit energized by said source under the control of said areas and responsive to the movement of each of said sections to lock and unlock said mechanism periodically.

17. In a sound motion picture system, employing a film formed with a movement track, said track being provided with areas spaced to control the transmission of light in varying degrees; means for feeding sections of the film continuously and at uniform speed; means for feeding another section intermittently and at relatively high speed, and including a feed arresting mechanism; means to free one of the film sections for uninterrupted feeding movement during the feed arresting operation of said mechanism; a light source; and light sensitive means energized by the action of said source with said areas to control said mechanism.

18. In a film feeding system for motion picture apparatus, means for feeding one section of the film continuously and at uniform speed; means for feeding another section of the same film intermittently, said last named means exerting a force continuously in the direction of film travel and including a feed arresting mechanism; means controlled by the degree of advancement of the intermittent section to effect the feed arresting action of said mechanism; and means controlled by the degree of advancement of the continuously moving section to effect the feed releasing action of said mechanism.

19. In a motion picture system, means for effecting a continuous movement of one section of film; means for effecting an intermittent movement of another section of the same film, including a driving element tending to exert a continuous feeding force upon the film and including an independent arresting mechanism, the feed arresting action of said mechanism being under control of the intermittent section so as to halt the advance of the film at a point where the picture is in frame; and means for periodically releasing said mechanism, said means being operative with the continuously moving section so as to effect the release once during the passage of each frame past a given point in said continuously moving section.

20. In a system of the character described employing a film bearing periodically spaced indicia; means for feeding one section of the film continuously; means for feeding another section of the film intermittently, said last named means exerting a continuous feeding force on the said intermittent section; a feed arresting and feed releasing mechanism; means responsive to the passage of said indicia past a predetermined point in the intermittent section of the film to effect the feed arresting action of said mechanism; and means responsive to the passage of said indicia past a predetermined point in the continuous section to effect the feed releasing action of said mechanism.

21. In a film feeding system for sound motion picture apparatus, means for feeding sections of the film continuously and at uniform speed; means comprising a feed arresting mechanism for feeding another section of the film intermittently and at relatively high speed, said means also including an element having a yielding relation with one of said first named sections to free said section for uninterrupted feeding movement during the feed arresting operation of said mechanism.

FREDERICK W. HOORN.